United States Patent
Nardi et al.

(10) Patent No.: US 10,643,011 B1
(45) Date of Patent: May 5, 2020

(54) AUTOMATIC DESIGN AND VERIFICATION OF SAFETY CRITICAL ELECTRONIC SYSTEMS

(71) Applicant: Cadence Design Systems, Inc., San Jose, CA (US)

(72) Inventors: Alessandra Nardi, San Jose, CA (US); Antonino Armato, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 47 days.

(21) Appl. No.: 16/023,937

(22) Filed: Jun. 29, 2018

(51) Int. Cl.
| | |
|---|---|
| *G06F 30/30* | (2020.01) |
| *G06F 30/394* | (2020.01) |
| *G06F 30/3323* | (2020.01) |
| *G06F 111/04* | (2020.01) |
| *G06F 111/20* | (2020.01) |

(52) U.S. Cl.
CPC .......... *G06F 30/30* (2020.01); *G06F 30/3323* (2020.01); *G06F 30/394* (2020.01); *G06F 2111/04* (2020.01); *G06F 2111/20* (2020.01)

(58) Field of Classification Search
USPC ....................................................... 716/102
See application file for complete search history.

(56) References Cited

U.S. PATENT DOCUMENTS

| | | | | |
|---|---|---|---|---|
| 7,784,019 B1* | 8/2010 | Zach | ................... | G06F 17/5068 716/123 |
| 8,273,610 B2* | 9/2012 | Or-Bach | ............. | H01L 21/6835 438/142 |
| 2012/0079439 A1* | 3/2012 | Akar | ................ | G11C 29/56008 716/106 |
| 2015/0261906 A1* | 9/2015 | Ramachandran | ... | G06F 17/5081 716/112 |

\* cited by examiner

*Primary Examiner* — Mohammed Alam

(74) *Attorney, Agent, or Firm* — Schwegman Lundberg & Woessner, P.A.

(57) ABSTRACT

Devices, methods, computer readable media, and other embodiments are described for design and verification of safety critical electronic systems. Some embodiments integrate functional safety (FS) data with circuit design data for use in electronic design automation (EDA) operations. One embodiment involves a device accessing FS and circuit design data; automatically analyzing register transfer level (RTL) design data using the FS data to perform one or more FS quality checks; and placing and routing the circuit design using the RTL design data and the set of FS data to perform FS-aware placement and routing. In some embodiments, failure modes and associated safety mechanisms to improve safety metrics associated with failure modes are automatically added to the circuit design during EDA operations. In other embodiments, additional FS-aware operations are performed. In some embodiments, the FS data is structured as a single Unified Safety Format (USF) file.

20 Claims, 11 Drawing Sheets

AUTOMATIC DESIGN AND VERIFICATION OF SAFETY CRITICAL ELECTRONIC SYSTEMS

TECHNICAL FIELD

Embodiments described herein relate to electronic design automation (EDA), and to systems, methods, devices, and instructions for generating circuit designs.

BACKGROUND

Electronic design automation (EDA) is a category of systems for assisting with the design of electronic systems and devices. Large, integrated circuit designs are often assembled from previously designed blocks. This enables reduced turnaround times for generation of an integrated circuit. Automated design of routing connections between individual circuit elements or design blocks are also part of such EDA system operations. Schematic and layout information for such block portions of a design may be exchanged or licensed as intellectual property.

BRIEF DESCRIPTION OF THE DRAWINGS

Various ones of the appended drawings merely illustrate example embodiments of the present disclosure and should not be considered as limiting its scope.

DETAILED DESCRIPTION

Embodiments described herein relate to EDA and to methods, computer media, and devices used for analyzing, optimizing, and creating electronic circuits with FS criteria. Such systems may automate failure mode, effect, and diagnostic analysis (FMEDA) and/or dependent failure analysis (DFA) using standardized input data and automatic analysis and design to meet and verify FS criteria. For example, circuitry for an automotive application may have specific failure and redundancy criteria to prevent or mitigate failures expected to increase the possibility of an automobile accident. Similarly, medical device circuitry may have backup requirements with safety critical design criteria. Various embodiments described herein use additional input FS data as part of a process flow for design of a circuit with FS structured as an integral part of the design flow. Such embodiments may include backup, active, and replacement request notification requirements. Design of such circuits with these FS criteria has historically been a manual process of reviewing and confirming special circuit criteria, with no special standardized process beyond the EDA design process of standard circuits without FS criteria. Embodiments described herein may use any portion of the presented complete framework to automate FS design changes, reporting, and metrics within a design flow.

Figure 1:
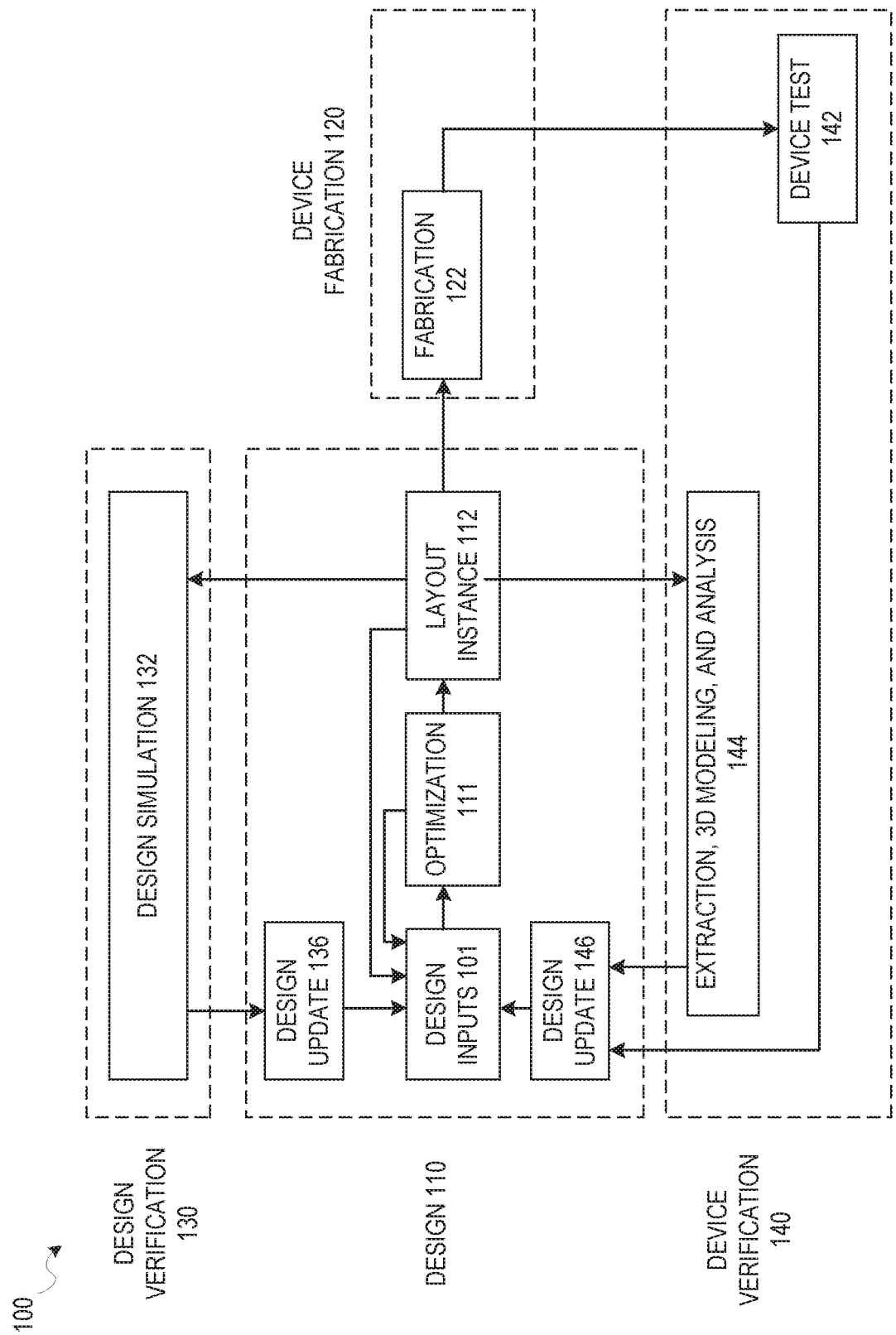
FIG. 1 is a diagram illustrating aspects of one possible design process flow, in accordance with some embodiments.

FIG. 1 is a diagram illustrating one possible design process flow which may be enhanced with FS data and FS design process flows shown in FIGS. 2-6. As described herein, the standard process flows of FIG. 1 may be enhanced
and integrated with the FS data and FS process flows described later to provide an EDA system with automatic design and verification operations for safety critical electronic circuits. In accordance with embodiments herein, such design process flows as shown in FIG. 1 accommodate data inputs of FS data in addition to the described design and analysis inputs, and may also include FS reporting and FS design modifications during design update operations. Additionally, it will be apparent that other design flow operations may function along with any integrated basic circuit operation and FS design considerations described herein as part of a design flow, and design flow 100 is particularly described here for the purposes of illustration. As illustrated, the overall design flow 100 includes a design phase 110, a device fabrication phase 120, a design verification phase 130, and a device verification phase 140. Each of these phases may include FS design and/or FS verification operations as described in more detail below, in addition to basic functional design of a circuit. The design phase 110 involves an initial design input operation 101 where the basic elements and functionality of a device are determined, as well as revisions based on various analyses and optimization of a circuit design. This design input operation 101 is where initial layouts for a circuit are generated before adjustments are made to ensure that functional requirements of the circuit are met. The initial strategy, tactics, and context for the device to be created are also generated in the design input operation 101, depending on the particular design algorithm to be used. Integration of FS with a design flow enables FS data to be input as part of an initial set of design inputs in design input operation 101.

In some embodiments, following an initial selection of design values in the design input operation 101, updates to an initial circuit design may be generated, in accordance with various embodiments described herein, during an optimization operation 111 or a layout instance 112, along with any other automated design processes. As described below, design constraints for a circuit design may be initiated with design inputs in the design input operation 101, and then may be analyzed using a timing analysis, according to various embodiments. While the design flow 100 shows optimization occurring prior to the layout instance 112, updates to a circuit design may be performed at any time to improve expected operation of a circuit design. Integration of FS data with such a process also allows verification of FS requirements, and automated adjustment of a circuit design to meet FS criteria may occur. For example, if a FS requirement for redundancy is not met, and an automated EDA option is available to automatically insert the redundancy, the circuit may be automatically changed to include the redundancy, with associated verification steps to confirm that the automated adjustment does not violate other functional or FS criteria of the circuit design. In various embodiments, functional and FS constraints for blocks in a circuit design may be generated prior to routing of connections in a circuit design, after routing, during register transfer level (RTL) operations, or as part of a final signoff optimization or verification prior to a device fabrication operation 122. Certain embodiments of operations described herein for generating and updating a circuit design and verifying the updated circuit design using FS data may therefore involve iterations of the design input operation 101, optimization operation 111, and layout instance 112 generation. In other systems, other design processes may be used.

Figure 2:
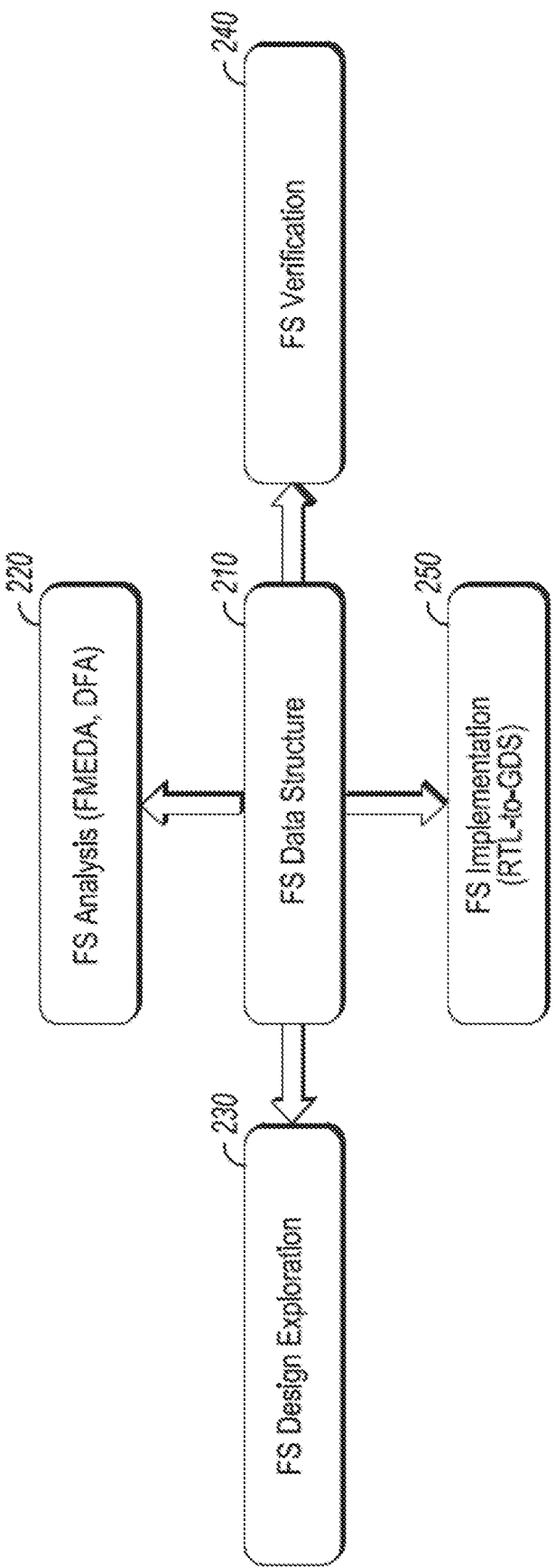
FIG. 2 illustrates aspects of functional safety (FS) data which may be integrated with a design process flow, in accordance with some embodiments described herein.
Figure 3:
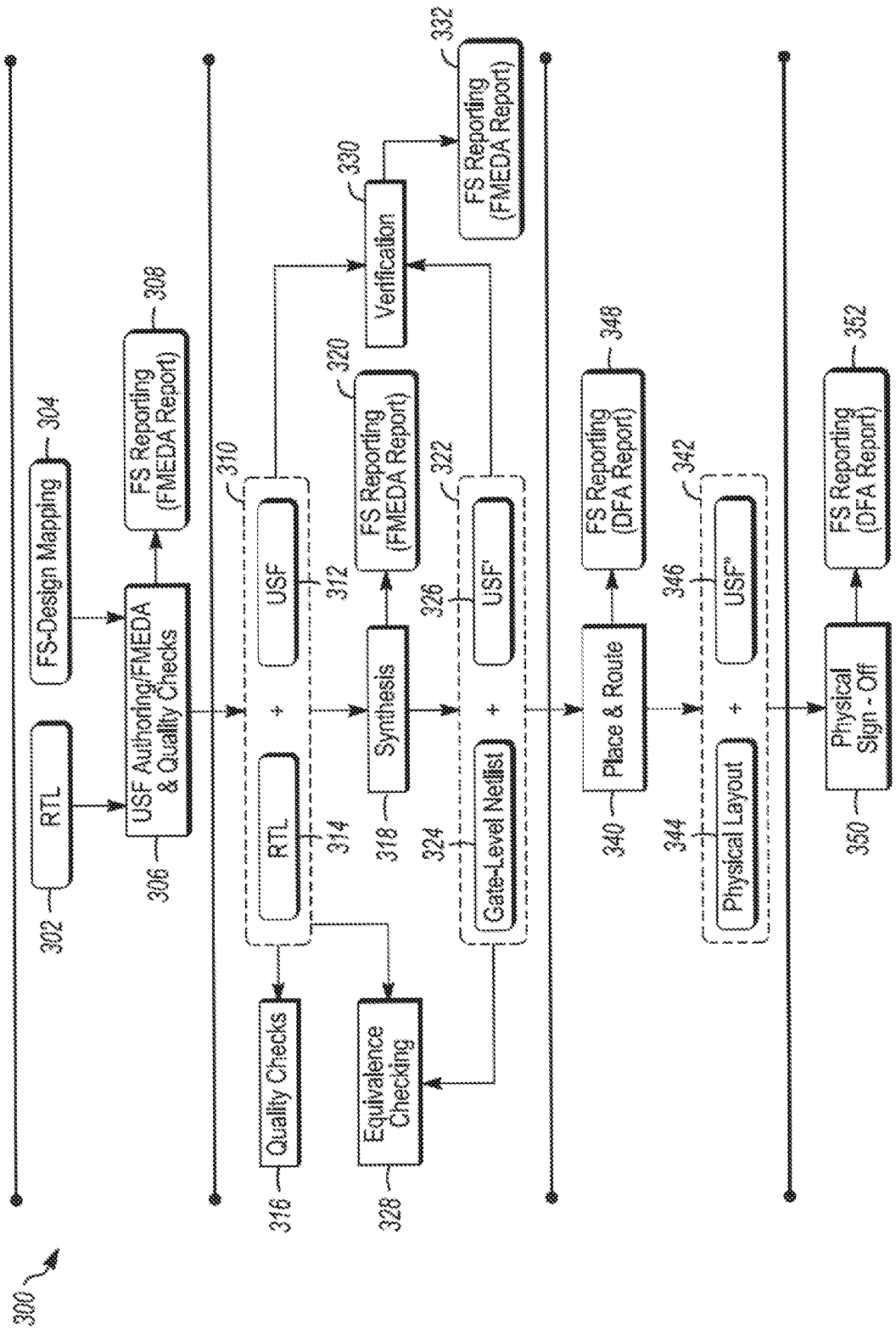
FIG. 3 is a diagram illustrating aspects of one possible design process flow, in accordance with some embodiments.

After design inputs (e.g., functional descriptions of a circuit and FS data) are used in the design input operation 101 to generate a circuit layout, and any optimization operations 111 are performed, a layout is generated in the layout instance 112. The layout describes the physical layout dimensions of the device that match the design inputs. This layout may then be used in the device fabrication operation 122 to generate a device, or additional testing and design updates may be performed using designer inputs or automated updates based on design simulation 132 operations or extraction, three-dimensional (3D) modeling, and analysis 144 operations. Once the device is generated, the device can be tested as part of device test 142 operations and layout modifications generated based on actual device performance. Each of these operations may involve design updates based on FS data and FS criteria, as well as FS verification and reporting. FIG. 2 then illustrates FS data and FS operations that can be integrated into the process flow of FIG. 1 or any other such process flow, and FIG. 3 illustrates a particular standardized design process flow with additional details for integration of FS design and verification into the process.

To include functional safety in a design flow, technical safety design parameters (e.g., requirements) for a design are captured and evaluated using FS analysis. The FS analysis is then used to drive design exploration for hardware and software changes, as well as overall implementation and verification. The FS design exploration may start with an RTL of the circuit design, and explore hardware and software safety mechanisms to meet safety metrics, as well as adjusting various additional metrics such as size and verification time. FS implementation (e.g., synthesis) inserts safety mechanisms (e.g., additional circuitry or design changes) targeted to meet or improve FS criteria as well as adjusting the circuit design with layout measures dictated by FS procedures (e.g., FS-aware placement and routing). FS verification validates coverage estimation of safety mechanisms and may use fault injection analysis to model safety and failure modes of a device.

FIG. 2 illustrates aspects of FS data which may be integrated with a design process flow, in accordance with some embodiments described herein. FIG. 2 shows a FS data structure 210 which includes FS data that may be used in various design and analysis processes as part of a design flow. As illustrated by FIG. 2, data from FS data structure 210 may be used by FS analysis operations 220. FS design exploration operations 230. FS verification operations 240, and FS implementation operations 250.

In FS integration with a design flow, technical safety requirements for a product (e.g. circuit, semiconductor device, etc.) are generated as part of the initial design description. In traditional FS processes, these requirements are evaluated using a manual FS analysis. One example is FMEDA, which is a systematic analysis technique to obtain subsystem and product level failure rates, failure modes, and diagnostic capabilities. Some such techniques may consider components of a system, functionality of each component, failure modes of each component, effects of each component failure mode on system operation, the ability of diagnostic components within the system to detect a failure, and various other system design metrics (e.g., operating conditions, safety and failure requirements, etc.) Given accurate input data, such a standardized analysis technique can predict system level failure rates based on component data. Another example of a traditional FS process is DFA, which in some embodiments may be a subset of FMEDA analysis. DFA involves identification of redundancy of functionality that can reduce failures for independent failure modes, as well as identifying independent and dependent failure modes in a system. Additional details of the use of FMEDA and DFA design and reporting are discussed below. In various embodiments, such operations may be used to achieve FS goals for a design with automatic integration of design and verification operations in a process flow for a circuit design.

The FS data structure 210 includes data that is provided by a designer as part of the circuit design goals. FS data structure 210 may essentially be considered as including input data along with other circuit design data as part of a design inputs 101 operation. The FS data from FS data structure 210 is then used in various other operations of the design flow such as the illustrated operations 220, 230, 240, and 250. For example, FS analysis operations 220 may use initial FS data to generate additional FS data values and may implement automated FS analysis operations using initial FS data. FS design exploration operations 230 may include operations to analyze hardware and software safety mechanisms to meet associated safety metrics (e.g., FS criteria) in the context of particular circuit elements and circuit design combinations. The results may be used to generate FS reporting and to implement improvements in other operations. FS implementation operations 250 may include design flow operations to adjust a design by including additional hardware safety mechanisms (e.g. failure reduction or failure detection elements within a design). FS verification 240 may include operations to validate coverage estimation of both hardware and software safety mechanisms, and may include fault injection operations based on FS analysis operations 220 to analyze various faults and failure detection mechanisms for a design. In some embodiments, this may include DFA synthesis and automatic layout countermeasures implemented as safety mechanisms (SM) within a design. This may include automatic adjustment and analysis of a circuit translated from a register transfer level description to graphic database system (GDS, GDSII) data used to control integrated circuit photomask plotting for integrated circuit fabrication during design flow. In various embodiments, different levels of detail and types of data may be used as inputs to the FS data structure 210 to be used by these FS operations. Additional examples of FS data structures 210 are described below in FIGS. 4 and 5.

These data structures may be used to verify and improve a design. Functional safety within a process flow uses reliability and failure rate information, information about available safety mechanisms (e.g., software safety, hardware safety, built-in self-test (BIST), etc.) to prevent and detect faults, and information about diagnostic coverage in a design that indicates how well mechanisms detect faults. This FS information may be used to improve a design by identifying better components and better or supplemental safety mechanisms that may be included in design updates. This also may be used to generate standardized functional safety analysis and reporting (e.g., SPFM, LFM, FIT, etc.) to provide FS context for the overall design and any design improvements made during the design process flow.

FIG. 3 is a diagram illustrating aspects of one possible design process flow, in accordance with some embodiments. FIG. 3 particularly describes a design-for-safety process flow 300. This process flow 300 introduces FS data for attribute definition and mapping within the design to be considered throughout the design process. It enables initial identification of safety intent as an input to EDA design operations, with automatic EDA consideration of failure modes (FM) and safety mechanisms (SM). In some embodiments, safety reporting aligned with safety standards (e.g., automotive, medical, etc.) may be included to match application requirements of a particular circuit design. In some embodiments, standard or required SM. DFA countermeasures, or fault injection testing for diagnostic coverage set by FA design criteria or standardized device criteria for an application may be integrated with the EDA process flow.

Process flow 300 begins with an initial circuit design 302 (e.g., RTL circuit device data) and FS design mapping information 304 used to generate a set of FS data 306. FS design mapping information 304 may be received as user inputs from a designer and captured and integrated with initial circuit design 302 information to be structured for use by the EDA process flow as FS data 306. The FS data may be captured during initial input operations through a combination of user defined inputs and calculated data derived from the user (e.g., circuit designer) inputs. Some embodiments may operate without operations 302-308 and may simply accept a single file format with FS data 306 as an input to be used in the process flow. In other embodiments, this FS data may be structured as multiple files or in any other such format to make FS inputs from a designer and any other source available for use by EDA operations of the process flow. This set of FS data 306 may be structured as a Unified Safety Format (USF) file, FMEDA analysis data, quality check data, or any combination of various FS data. FS data 306 may be used for initial FS reporting 308 to generate a standardized FS report of FS inputs to the EDA process flow, which are used to improve FS of an initial circuit design 302. FS data 306 does not include the initial circuit design 302 data, but includes FS information that depends both on the FS criteria of the application as well as the particular failure information associated with the design of initial circuit design 302. These operations may be considered FS data authoring by a designer to create FS data in a format usable by EDA systems as part of a process flow, with FS (e.g., FMEDA) reporting on the initial FS information input into the process flow.

The FS data 306 is then used along with the initial circuit design data 302 as a combination of design data 310 which includes circuit design data 314 and FS data 312 as part of a set of EDA front-end operations. The design data 310 (e.g., data 314 and 312) are used in quality check operations 316, verification operations 330, equivalence checking operations 328, and synthesis operations 318 as part of the front-end process flow within the overall process flow. While shown linearly within FIG. 3, any of these operations may be iterative, or may involve initial analysis, modification of the design, and checking with removal or additional changes based on checks within the process flow.

Synthesis operations 318 in particular may include insertion of design elements within the overall circuit design to meet FS criteria or improve FS performance. For example, automatic insertion of circuit redundancy (e.g., triple modular redundancy (TMR), dual-core lock step (DCLS), dual modular redundancy (DMR)) to reduce failures, automatic insertion of test points or monitoring circuitry (e.g., built-in-self-test (BIST)), automatic error detection circuitry (e.g. parity protected register circuitry, error correction code (ECC) circuitry, input/output (I/O) loopback circuitry, etc.), or other such standardized FS mechanisms and FS structures devoted to alarm transportation and fake error injection may be automatically inserted based on the FS design mapping 304 identified in the initial steps of the process flow and/or and included in FS data 306. FS reporting 308 is available to identify which of these mechanisms are available as part of the EDA process flow, and later reporting (e.g., FS reporting 332, 348, 352) may identify which mechanisms were actually used and how.

After synthesis operations 318 to include any insertion of FS mechanisms within a design, the initial design data 310 and the updated design data 322 (e.g. including updated circuit design 324 and updated FS data 326 reflecting FS information associated with the inserted FS mechanism(s)) are used for various operations such as equivalence checking 328 and verification 330 to confirm that the elements were added to the design correctly without generating problems with the circuit design. In some embodiments, initial design data 310 may use RTL data for circuit design data 314. In various embodiments, synthesis operations 318 may result in RTL data as part of updated design data 322, or updated design data may be a gate-level netlist or any other such circuit design data. In some embodiments, quality check operations 316 or any combination of verification and checking operations may confirm circuit design consistency with FS criteria. This may also involve tagging of FS based modifications to the initial circuit design. Additional checks may identify expected changes to FS criteria such as expected changes in failure rates or failure reporting and effects based on FS based modifications to the design.

Once the updated design data 322 is generated with expected operations for additional iterations or updates, the updated design data 322 is used for place and route operations 340. In some embodiments. FS-aware placement and routing with rules to reduce common cause failures and cascading failures are used, with associated FS reporting based on routing and placement failure risks (e.g., DFA reporting). This results in output circuit design data 342, which includes physical layout circuit design data 344 (e.g., GDSII data) combined with output FS data 346. This output circuit design data 342 may then be used for physical sign-off operations 350, with associated output FS reporting 352. This may include any analysis and checks of the final output design against input FS criteria, such as expected specific failure criteria which limits expected failure rates or sets reporting and response criteria for failures. In some embodiments, physical sign-off operations 350 output data files which may be used by fabrication hardware to generate a physical semiconductor circuit from the output circuit design data 342.

A process flow 300 may, for example, be targeted to particular FS criteria for an application such as an automotive application. In such an environment, particular FS criteria are related to providing reliability and functional safety so that if something breaks, recovery may be made to a safe situation. Such criteria may include FS quality metrics, robustness metrics, and reliability metrics. FS quality may include metrics to meet design specifications at start of life and produce zero defective parts per million during initial operation. FS design robustness may include designs configured to tolerate random failures with signal integrity, power integrity, and other such failure tolerant systems. FS reliability metrics may include designs to meet specifications until end-of-life, measured in failures per billion hours of operations. Failures analyzed may include latchup, electrostatic discharge, temperature, aging, electromigration, and other such failures. Functional safety integration into process flows involves circuit designs optimized to manage all of the above as well as a design to transition to a safety state when any random or permanent failure occurs. Circuit objects (e.g., including individual objects and blocks or groups of objects) in a circuit design may have associated FS data to describe both operation of the individual objects and criteria applied to the objects and overall system operation. Combinations of FS information for objects and the design as a whole may be used during a FS process flow to measure functional safety and generate FS reporting. This may include multiple different levels of analysis, such as FMEDA reporting with a systematic approach to analyze what can go wrong and whether the design is able to detect failures. This may include calculations of random hardware safety metrics from FS data for objects as integrated in a particular design, with updates as the design changes. This may include timing analysis with evaluations on whether failures can be detected in time to revert to a safe state. This may also include DFA reporting to evaluate common cause failure effects that can reduce the effectiveness of safety measures. Automated processes in the design flow, in accordance with embodiments described herein, may combine circuit designs with information about objects and FS criteria (e.g., structured as FS data) for automated design and verification operations.

Figure 4:
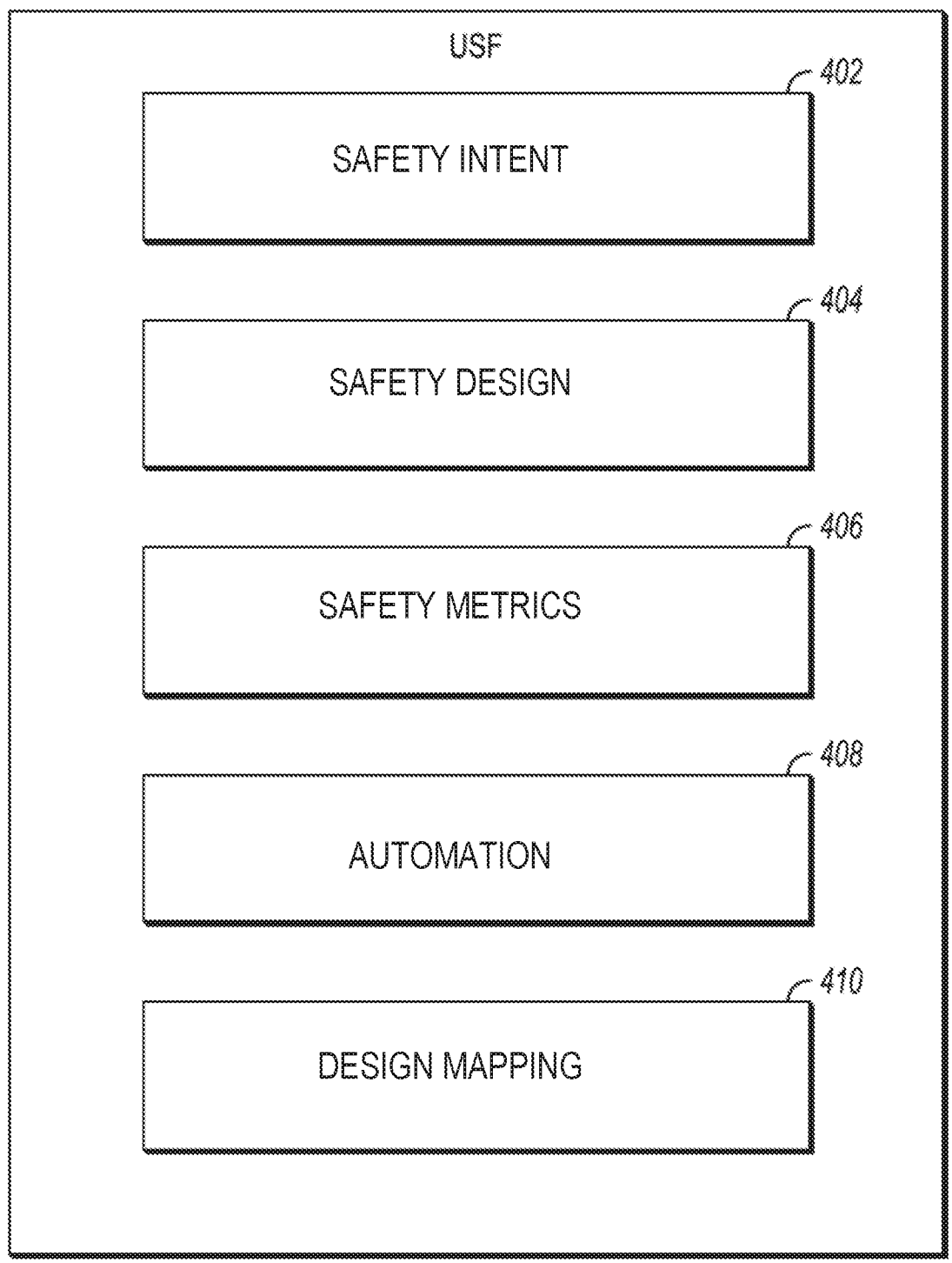
FIG. 4 illustrates aspects of FS data which may be used with an EDA design process for FS, in accordance with some embodiments.
Figure 5:
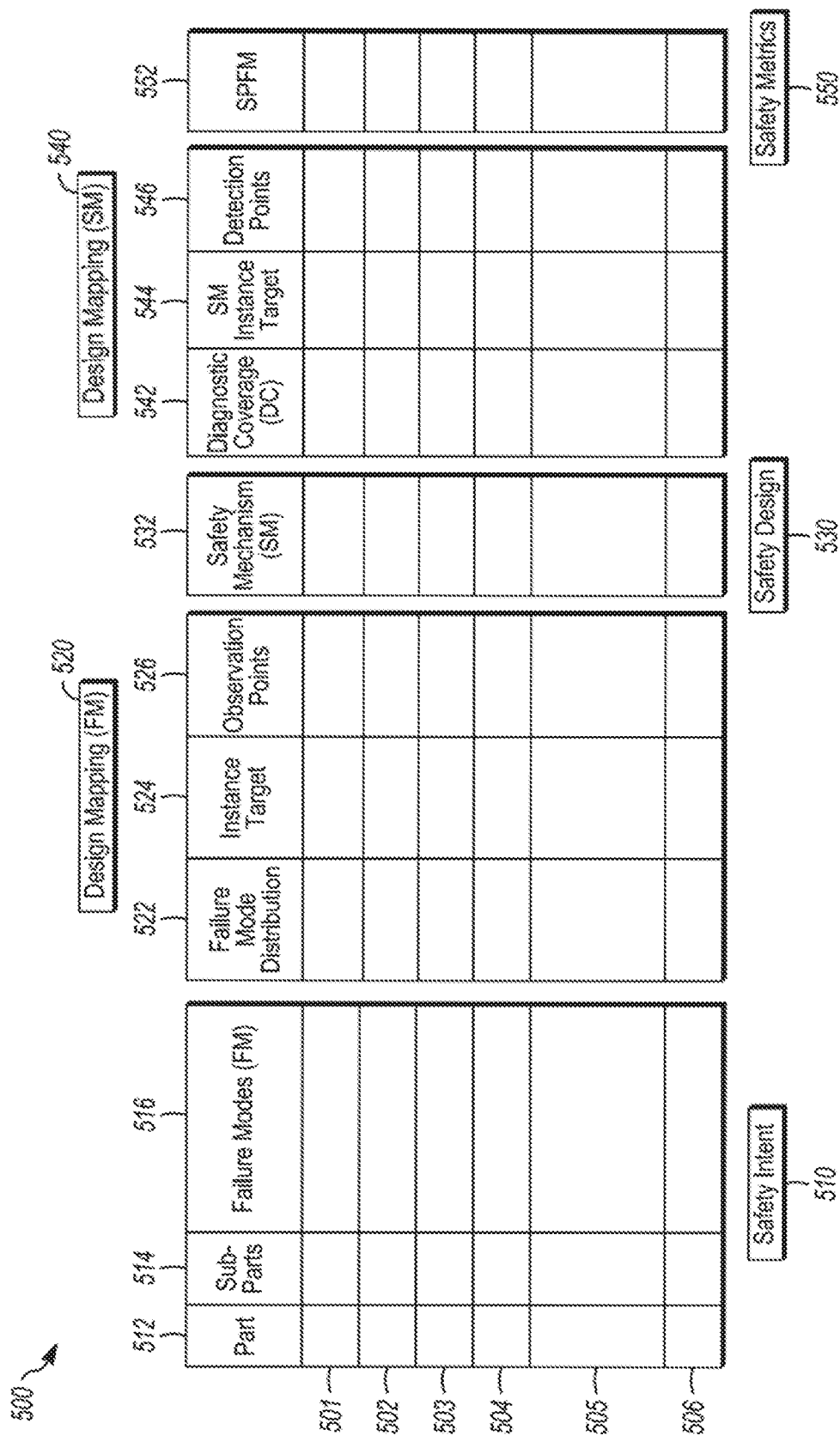
FIG. 5 illustrates aspects of FS data which may be used with an EDA design process for FS, in accordance with some embodiments.

As may be seen above from the description of process flow 300, automatic design and verification of safety critical electronic systems as described herein relies on designer (e.g., user) inputs to set FS criteria, which is propagated automatically through the process flow. In complex devices, such FS criteria may include significant complexity. FIGS. 4 and 5 describe standardized formats for ordering the complex FS criteria which are used within a FS-aware process flow.

FIG. 4 thus illustrates aspects of functional safety data which may be used with an EDA design process for FS, in accordance with some embodiments. FIG. 4 illustrates an example Unified Safety Format (USF) 400. In the example USF 400, safety intent data 402, safety design data 404, safety metric data 406, information for automation data 408, and design mapping data 410 are included. This FS data structure of USF 400 is different from standard FMEDA reporting formats, and allows introduction and maintenance of FS data within a process of low design hierarchy to enable automation of design and reporting. Circuit designs include any number of circuit elements and blocks of elements. Each element and different combinations of elements (e.g., blocks) may have different associated FS goals and other such data. From a database view, such elements and blocks may have safety goals, failure modes, reliability data, and associated compatible safety mechanisms. From an operational view, the configuration of the elements and blocks into a circuit design may use the database view information for FS analysis, FS design updates. FS verification. FS sign-off. FS reporting, and any other operations to confirm that FS criteria associated with the design are met. The USF 400 elements allow the database information for circuit elements to be combined with information about FS operations in a way that can be used by the process flow to implement automatic FS design updates and reporting. For example, safety intent data 402 may reflect the safety and reliability criteria set by a designer for a circuit design. Safety design data 404 and safety metric data 406 may reflect the FS performance of the circuit elements of a design as arranged in a particular circuit design. Data 402, 404, and 406 reflect FMEDA report data, which may be combined with information for automation data 408 to enable automated EDA based improvements to a circuit design. For example, associating blocks of data with particular allowed automated improvements; identifying automation to adjust problematic routing and placement from a FS perspective that may otherwise meet device performance criteria; or other such data may be identified as part of information for automation data 408. Design mapping data 410 then tracks user and system updates to a circuit design to map FS operations. For example, addition of SM circuitry to a circuit design may be tracked as a way of mapping a circuit design change to a particular FS criterion when the SM circuitry improves associated FS performance or helps the circuit design meet a performance threshold. Such information may then be used for FS reporting as described above in various operations of a FS enabled process flow.

In various embodiments, the exact information included in FS data that is gathered and used by EDA operations may vary. In some embodiments, objects are sorted by various part descriptions and may have associated information such as the ability of a part to impact safety goals (e.g., FS criteria) of the overall design. Additional information may include failure rates, safety mechanisms that may be used to modify the object, and associated FS performance associated with the object. This information may thus describe how objects can impact FS goals, how likely objects are to fail, options for detecting or preventing failures, and various related safety metrics, such as single point fault metrics (SPFM), latent fault metrics (LFM), and/or probabilistic metrics for hardware failure (PMHF).

FIG. 5 illustrates aspects of functional safety data which may be used with an EDA design process for FS in accordance with some embodiments. FIG. 5 illustrates a detailed example of FS data in an example USF file format 500. USF file format 500 includes data for a plurality of circuit objects 501-506. Each circuit object 501-506 may be an individual element of a circuit or a block or group of circuit objects. In the example of FIG. 5, each object 501-506 has associated safety intent data 510, failure mode design mapping data 520, safety design data 530, safety mechanism design mapping 540, and safety metric data 550. Such data may be stored in fields of a table, with each field comprising data for an object (e.g. a circuit object, block, or element). In other embodiments, other data may be included in FS data, or other combinations of this data and other data may be used. As illustrated, safety intent data 510 includes part data 512 and any associated sub-part data (e.g. data on objects, elements, or sub-blocks of a block or portion of a circuit design), as well as a listing of any possible failure modes 516 associated with the part 512 and any sub-parts 514. Safety intent data 510 may include information that identifies the safety intent for different portions of a circuit design. Different portions of the design having similar attributes may be collected together into groupings (e.g., blocks of circuit elements). In some embodiments, grouping different portions of a design with different safety features, rules, or FS criteria may occur within a single set of FS data. In other embodiments, different portions of a circuit design (e.g., critical and non-critical portions of a system on a chip (SoC)) may have different FS data. Not every part 512 will have an associated sub-part 514. Similarly, if associated failure modes are negligible, some parts may not have an associated failure mode. In other embodiments, only parts (e.g., objects or object groups) with significant failure modes are included in the FS data of USF file format 500. Failure mode design mapping data 520 includes failure mode distribution data 522, instance target data 524, and observation point data 526. Safety designation data 530 includes safety mechanism data 532. Safety mechanism design mapping data 540 includes diagnostic coverage data 542. SM instance target 544, and detection points 546. Safety metric data 550 includes failure rate data 552. In each of these instances, certain parts 501-506 may have multiple pieces of data associated with the particular part, or may not have any data associated. For example, part 505 may have no associated sub-parts and no associated safety mechanism, while part 501 may have multiple safety mechanisms, and part 502 may have multiple sub-parts.

Table 1 below illustrates examples of additional details that may be included in various embodiments of FS data.

| DS Group | DS field |
| --- | --- |
| Safety Goals | Tag |
|  | SPFM Permanent |
|  | SPFM Transient |
|  | LFM |
| Failure Modes | Part |
|  | Subpart |
|  | Failure Mode Definition |
|  | Failure Mode Distribution Permanent |
|  | Failure Mode Distribution Transient |
|  | SPFM Permanent |
|  | SPFM Transient |
|  | LFM |
|  | Observation Points |
|  | Percentage Safe Permanent |
|  | Percentage Sale Transient |
|  | Type |
|  | Classification |
| Safety Mechanisms | Safety Mechanism Definition |
|  | Type |
|  | DC Permanent (SPFM Permanent) |
|  | DC Transient (SPFM Transient) |
|  | DC Latent (LFM) |
|  | DTI |
|  | Detection Points Permanent |
|  | Detection Points Transient |
|  | Detection Points Latent |
|  | Classification |
| Reliability | Tag |
|  | Type |
|  | Area |
|  | λe trans |
|  | λe perm |
|  | λe bit/FE |

Figure 6:
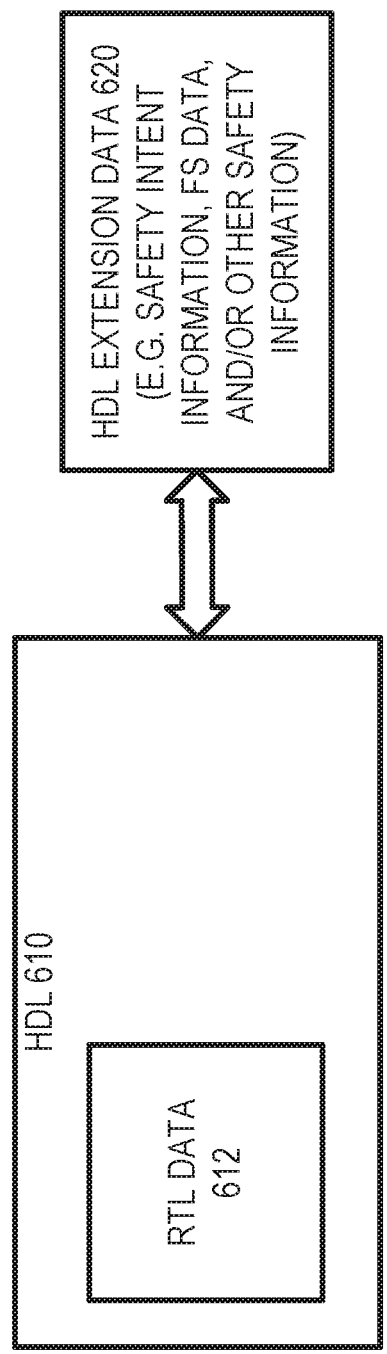
FIG. 6 illustrates aspects of FS data integration with EDA operations, in accordance with some embodiments described herein.
Figure 7:
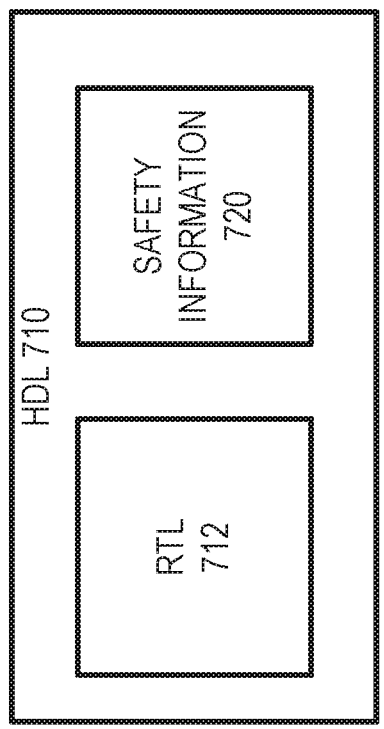
FIG. 7 illustrates aspects of FS data integration with EDA operations, in accordance with some embodiments described herein.

FIGS. 6 and 7 illustrate aspects of functional safety data integration with EDA operations, in accordance with some embodiments described herein. In some embodiments as described above, the FS information and FS data used by a process flow are integrated into a single file format for use with circuit design data. In other embodiments, not all of the information for different safety categories need be in a single file format. For example, in some embodiments, only safety design intent technology information is used as the FS data, and this information may be used with circuit design data in a process flow without other FS data described herein. For example, FIG. 6 shows an example in which FS data is implemented as a language extension for an existing hardware description language (HDL). In the example of FIG. 6, rather than using FS data in table formats or other file formats as described above in FIGS. 4 and 5, the FS data is structured as HDL extension data 620 which may be used in conjunction with HDL 610 and RTL data 612, which describes the circuit being designed with FS-aware EDA processes. HDL extension data 620 is structured as a language extension to be used with the HDL. In this approach, language constructs pertaining to safety information, which may be used for automatic design and verification, are added to extend the functionality of a conventional HDL such as VERILOG or VHDL. This HDL extension data 620 may contain not just safety intent information, but also any FS data or safety information in accordance with any embodiment described herein. In the example of FIG. 7, the safety information 720 is maintained as one or more files formatted in HDL 710 file format, along with other files for the circuit design such as RTL 712. This safety information 720 may include safety intent information, FS data, or any other such safety information in accordance with embodiments described herein. In the example of FIG. 7, the safety information is contained in a separate file (or multiple files) as safety information or FS data separate from the from the HDL RTL file and other circuit design information. In further embodiments, all such data may be integrated into a single file, or the circuit design and FS input data and data for the process flow may be configured as a single file.

Figure 8:
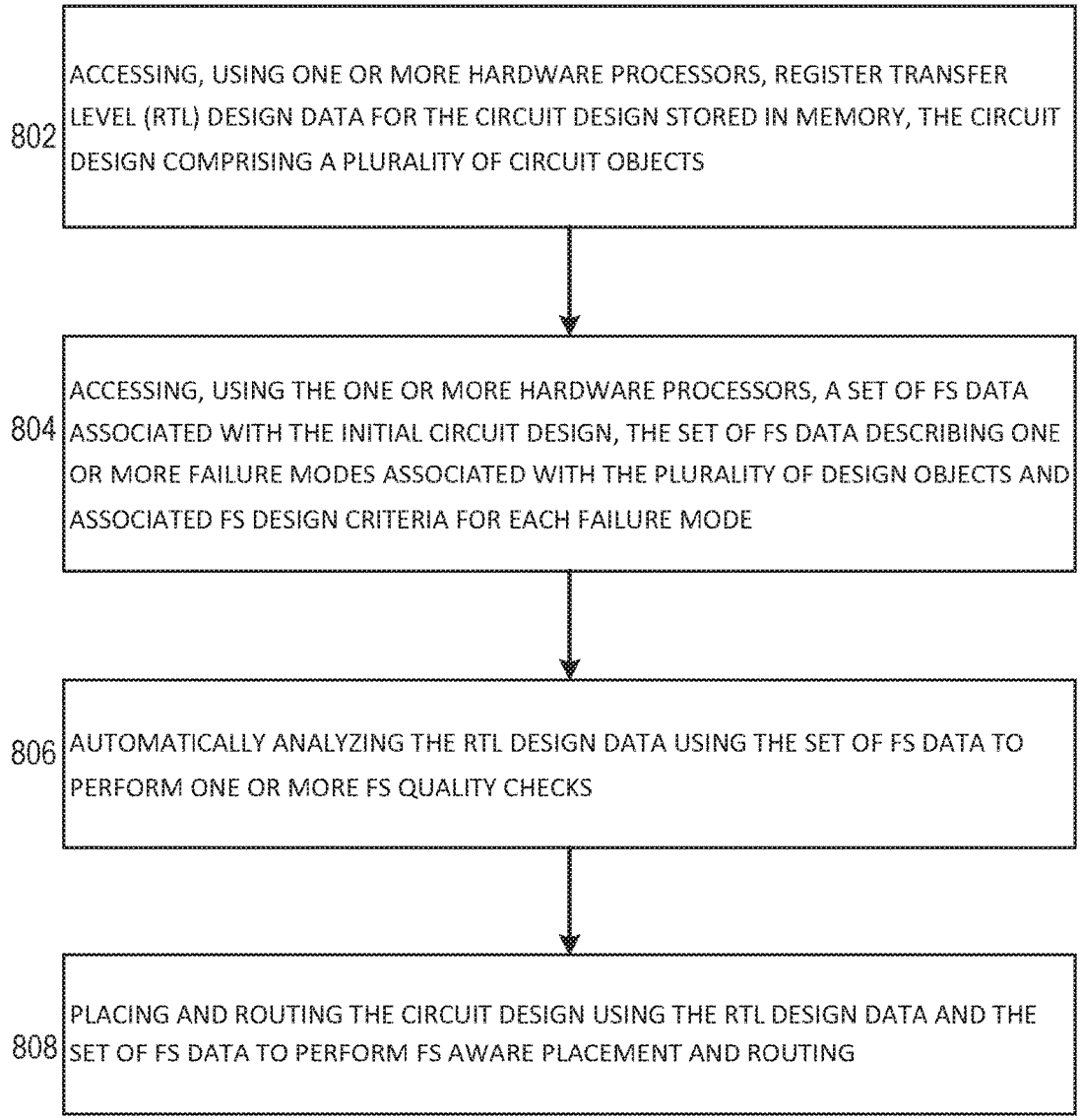
FIG. 8 illustrates a method for automatic design and verification of safety critical electronic systems. In accordance with some embodiments.

FIG. 8 illustrates a method 800 for automatic design and verification of safety critical electronic systems, in accordance with some embodiments. The method 800 particularly describes one method for a FS-aware process flow to update a circuit design as part of processes to generate safety critical electronic devices. In some embodiments, the method 800 is performed by a computing device with one or more processors. In some embodiments, the method 800 is embodied in computer-readable instructions stored in a non-transitory storage device, such that when the instructions are executed by one or more processors of a device, the device performs the method 800. Other embodiments may be implemented using any acceptable format or instantiation.

Method 800 begins with operation 802 involving accessing, using one or more hardware processors. RTL design data for the circuit design stored in memory. Such design data may be provided from another EDA device or operation, or by a user or circuit designer. The circuit design comprises a plurality of objects, where each object may be an element (e.g., a transistor, resistor, capacitor, transmission line, amplifier, etc.) of a circuit design, a block which is a defined grouping of circuit elements, or any other such details of a circuit design. Then in operation 804, the one or more hardware processors additionally access a set of FS data associated with the initial circuit design, with the set of FS data describing at least one or more failure modes associated with the plurality of design objects and associated FS design criteria for each failure mode. Such FS data may be a USF file, an HDL file with FS information, a set of HDL extension data with FS information, multiple files, a table such as the table of FIG. 5, or any other such FS data which may be used as described herein.

The RTL design data is then automatically analyzed using the set of FS data to perform one or more FS quality checks in operation 806. Such quality checks may, for example, determine expected failure rates for various portions of the circuit design and compare these rates against threshold values. Any other circuit design FS and design operation criteria may be analyzed during such operations. If the FS criteria are not met, the process may automatically identify safety mechanisms that may be automatically integrated into the design. Such safety mechanisms may be defined and identified as allowable within the circuit design by the FS data. If the FS criteria are met, either initially or after iterations of improvements and changes to the design, the process proceeds to operation 808 with placing and routing the circuit design using the RTL design data and the set of FS data to perform FS-aware placement and routing.

Figure 9:
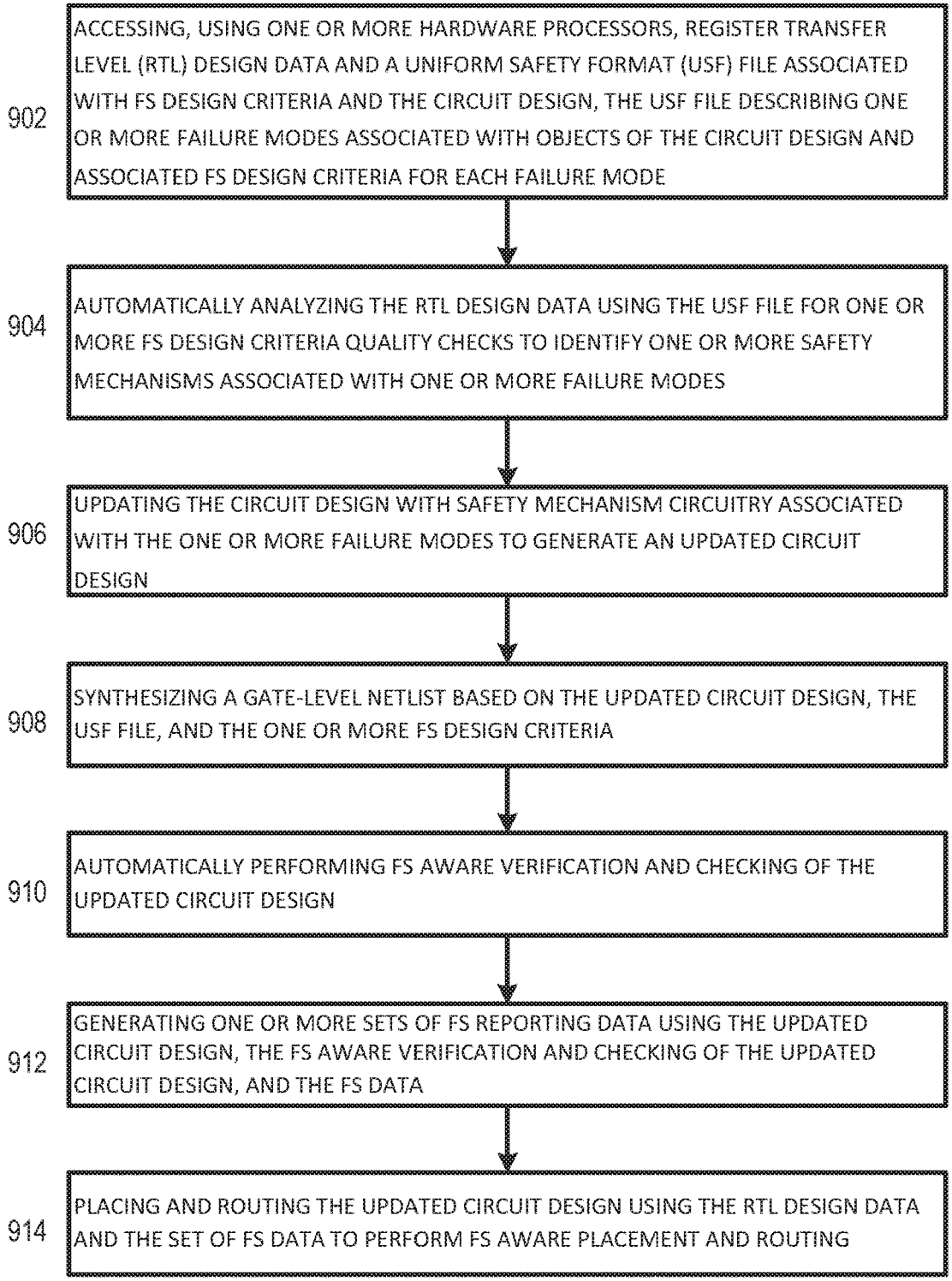
FIG. 9 illustrates a method for automatic design and verification of safety critical electronic systems. In accordance with some embodiments.

FIG. 9 illustrates a method 900 for automatic design and verification of safety critical electronic systems, in accordance with some embodiments. The method 900 describes another method for design and verification operations to generate and updated circuit design for use in generating semiconductor devices. As described above for method 800, in some embodiments the method 900 is performed by a computing device with one or more processors. In some embodiments, the method 900 is embodied in computer-readable instructions stored in a non-transitory storage device, such that when the instructions are executed by one or more processors of a device, the device performs the method 800. Other embodiments may be implemented using any acceptable format or instantiation to generate a circuit design meeting functional safety FS design criteria.

Method 900 includes operation 902 to access using one or more hardware processors, RTL design data for the circuit design stored in memory and to access a USF associated with the FS design criteria and the circuit design, with the USF file describing one or more failure modes associated with the plurality of design objects and associated FS design criteria for each failure mode. While method 900 describes the use of a single USF, as described herein, similar embodiments may use multiple files or FS data structured in various different formats. Operation 904 then involves automatically analyzing the RTL design data using the USF file for one or more FS design criteria quality checks to identify one or more safety mechanisms associated with one or more failure modes and then in operation 906, the circuit design is updated with safety mechanism objects associated with the one or more failure modes to generate an updated circuit design. Such safety mechanism objects may be any circuit elements configured to improve FS performance of the circuit design as described herein, such as combinations of objects (e.g., circuit elements or blocks) for common cause failure (CCF) countermeasures, redundancy, error identification or correction, or other such safety mechanisms. Then in operation 908, a gate-level netlist is synthesized based on the updated circuit design, the USF file, and the one or more FS design criteria. In some embodiments, synthesis may be performed at different levels, such as RTL to RTL synthesis rather than RTL to gate-level synthesis. In further embodiments, multiple iterations of synthesis and analysis may be performed for different SM insertion and FM improvement as part of circuit design updates. These may be complementary or separate from operation 910 to automatically perform FS-aware verification and checking of the updated circuit design and operation 912 to generate one or more sets of FS reporting data using the gate-level netlist, the FS-aware verification and checking of the updated circuit design, and the FS data. The updated circuit design is then placed and routed in operation 914 using the FS data to perform FS-aware placement and routing. Such operations may, for example, involve CCF countermeasures such as power supply line separation, isolation of structures, insertion of temperature sensors, asymmetric core orientation, or other such FS based placement and routing rules.

While particular embodiments are described above, including ordered steps and placement of elements in various orders, it will be apparent that other embodiments may include repeated operations, or any number of intervening operations between the operations described.

Figure 10:
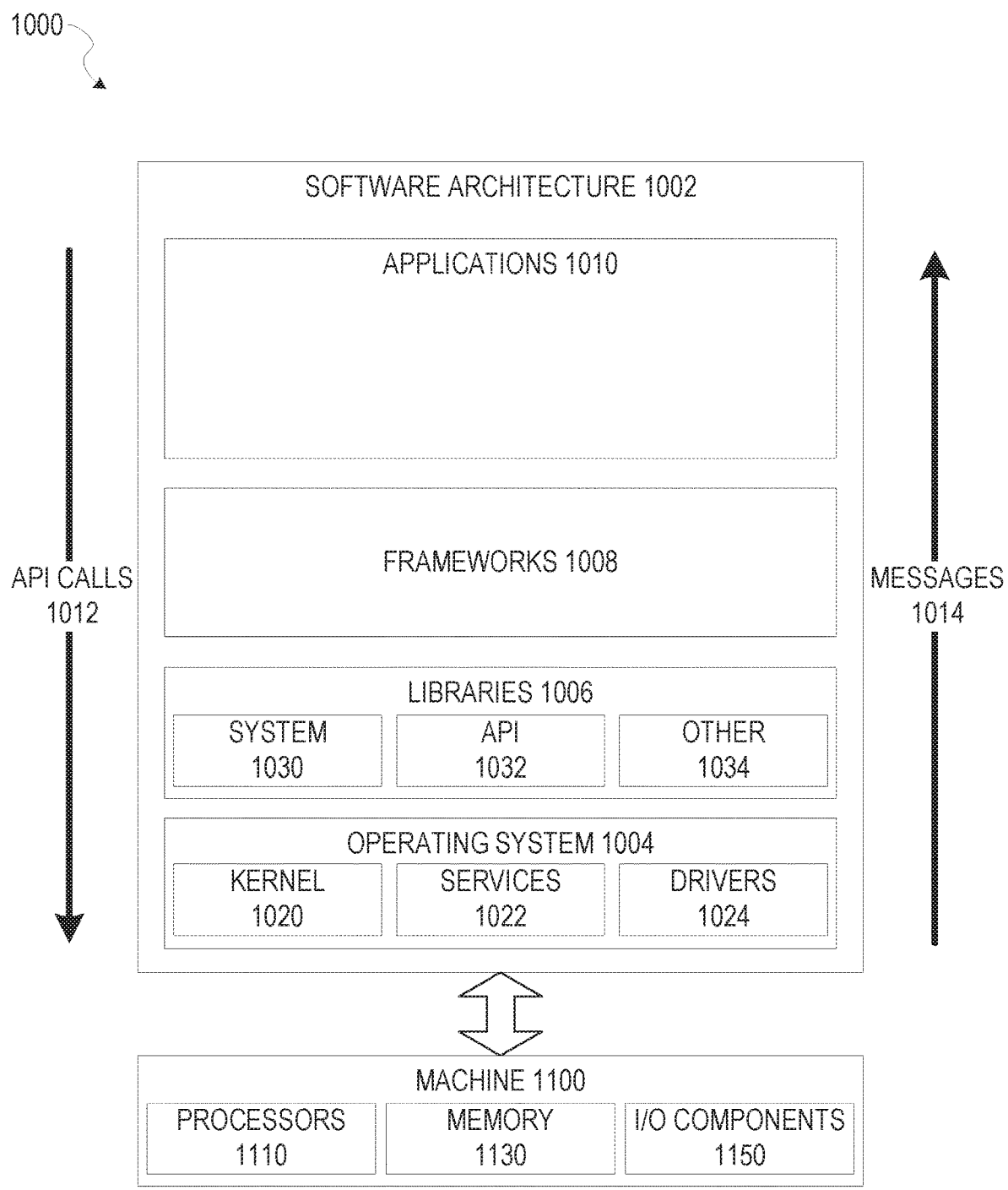
FIG. 10 is a block diagram illustrating an example of a software architecture that may be operating on an EDA computer and used with EDA methods of design and verification for FS, in accordance with some embodiments.

FIG. 10 is a block diagram 1000 illustrating an example of a software architecture 1002 that may be operating on an EDA computer and used with methods for integration of FS data into the process flow for FS-aware design and verification of a semiconductor device. The software architecture 1002 can be used as an EDA computing device to implement any of the methods described above. Aspects of the software architecture 1002 may, in various embodiments, be used to store circuit designs and FS data, as well as execute operations for design checks, verification, synthesis, placement and routing, physical sign-off, or any other such operations in an EDA environment to generate circuit designs, with physical devices generated using these circuit designs.

FIG. 10 is merely a non-limiting example of a software architecture 1002, and it will be appreciated that many other architectures can be implemented to facilitate the functionality described herein. In various embodiments, the software architecture 1002 is implemented by hardware such as a machine 1100 that includes processors 1110, memory 1130, and I/O components 1150. In this example, the software architecture 1002 can be conceptualized as a stack of layers where each layer may provide a particular functionality. For example, the software architecture 1002 includes layers such as an operating system 1004, libraries 1006, software frameworks 1008, and applications 1010. Operationally, the applications 1010 invoke application programming interface (API) calls 1012 through the software stack and receive messages 1014 in response to the API calls 1012, consistent with some embodiments. In various embodiments, any client device, server computer of a server system, or other device described herein may operate using elements of the software architecture 1002. An EDA computing device described herein may additionally be implemented using aspects of the software architecture 1002, with the software architecture 1002 adapted for operating to perform EDA operations with FS data in accordance with embodiments described herein.

In one embodiment, an EDA application of the applications 1010 performs operations in a FS-aware design and verification process flow, according to embodiments described herein, using various modules within the software architecture 1002. For example, in one embodiment, an EDA computing device similar to the machine 1100 includes the memory 1130, and one or more processors 1110 are used to implement a process flow similar to process flow 300.

In some embodiments, an output module may be used to update a display of the I/O components 1150 of the EDA computing device with data associated with the updated circuit design and FS data as part of operations of the process flow implemented as modules of applications 1010. In various other embodiments, rather than being implemented as modules of one or more applications 1010, some or all of the EDA modules implementing embodiments described herein may be using elements of the libraries 1006 or the operating system 1004.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, signal-processing drivers to optimize modeling computation, memory drivers, serial communication drivers (e.g., Universal Serial Bus (USB) drivers). WI-FI® drivers, audio drivers, power management drivers, and so forth.

In some embodiments, the libraries 1006 provide a low-level common infrastructure utilized by the applications 1010. The libraries 1006 can include system libraries 1030 such as libraries of multi-instance blocks for use in an EDA environment or other libraries that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC). Moving Picture Experts Group Layer-3 (MP3), Advanced Audio Coding (AAC), Adaptive Multi-Rate (AMR) audio codec. Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1006 may also include other libraries 1034.

The software frameworks 1008 provide a high-level common infrastructure that can be utilized by the applications 1010, according to some embodiments. For example, the software frameworks 1008 provide various graphic user interface (GUI) functions, high-level resource management, high-level location services, and so forth. The software frameworks 1008 can provide a broad spectrum of other APIs that can be utilized by the applications 1010, some of which may be specific to a particular operating system 1004 or platform. In various embodiments, the systems, methods, devices, and instructions described herein may use various files, macros, libraries, and other elements of an EDA design environment to implement analysis described herein. This includes analysis of input design files for an integrated circuit design, along with any element of hierarchical analysis that may be used as part of or along with the embodiments described herein. While netlist files, library files, SDC files, and viewDefinition files are examples that may operate within a software architecture 1002, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1100 including processors 1110), with these operations being accessible via a network (e.g., the Internet) and via one or more appropriate interfaces (e.g., an API). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine 1100, but deployed across a number of machines 1100. In some example embodiments, the processors 1110 or processor-implemented modules are located in a single geographic location (e.g., within a home environment, an office environment, or a server farm). In other example embodiments, the processors 1110 or processor-implemented modules are distributed across a number of geographic locations.

Figure 11:
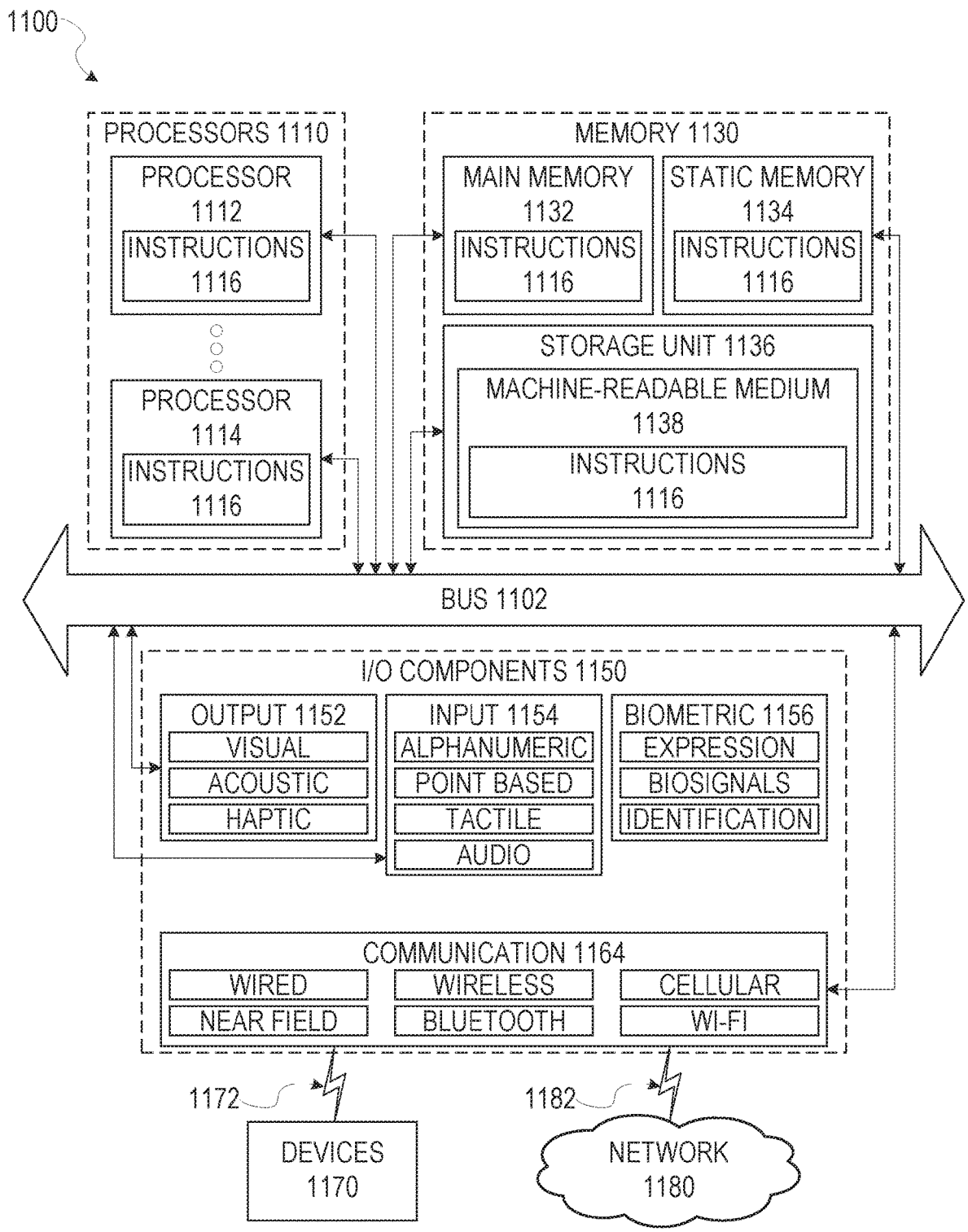
FIG. 11 is a diagrammatic representation of a machine in the form of a computer system within which a set of instructions are executed, causing the machine to perform any one or more of the methodologies discussed herein, according to some example embodiments.

FIG. 11 is a diagrammatic representation of the machine 1100 in the form of a computer system within which a set of instructions may be executed for causing the machine 1100 to perform any one or more of the methodologies discussed herein, according to an example embodiment. FIG. 11 shows components of the machine 1100, which is, according to some embodiments, able to read instructions from a machine-readable medium (e.g., a machine-readable storage medium) and perform any one or more of the methodologies discussed herein. In some embodiments, the machine 1100 may operate with instructions 1116 (e.g., software, a program, an application, an applet, an app, or other executable code) for causing the machine 1100 to perform any one or more of the methodologies discussed. In alternative embodiments, the machine 1100 operates as a standalone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), a media system, a cellular telephone, a smart phone, a mobile device, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 1112 and a processor 1114 that may execute the instructions 1116. The term "processor" is intended to include multi-core processors 1110 that may comprise two or more independent processors 1112, 1114 (also referred to as "cores") that can execute the instructions 1116 contemporaneously. Although FIG. 11 shows multiple processors 1110, the machine 1100 may include a single processor 1112 with a single core, a single processor 1112 with multiple cores (e.g., a multi-core processor 1112), multiple processors 1110 with a single core, multiple processors 1110 with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown, in an example embodiment, to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., the instructions 1116) for execution by a machine (e.g., the machine 1100), such that the instructions, when executed by one or more processors of the machine (e.g., the processors 1110), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152, input components 1154, and biometric components 1156. The output components 1152 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow 100, or outputs for circuit fabrication. In various embodiments, outputs of a timing analysis are used to generate updates and changes to a circuit design, and after a final closure of timing with all associated timing thresholds and design requirements met, circuit design output files are used to generate masks and other physical outputs for generation of a circuit. As described herein. "requirements," "design elements," and other aspects of a circuit design refer to selectable values that are set as part of the design of a circuit. Such design requirements or elements may be adjusted by a system operator or circuit designer to suit the particular goals of a project or circuit that results from the operations described herein.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, the communication components 1164 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1170 may be another machine or any of a wide variety of peripheral devices (e.g., a peripheral device coupled via a USB).

Transmission Medium

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT). Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks. Universal Mobile Telecommunications System (UMTS), High-speed Packet Access (HSPA), Worldwide Interoperability for Microwave Access (WiMAX), Long-Term Evolution (LTE) standard, others defined by various standard-setting organizations, other long-range protocols, or other data transfer technology.

Furthermore, the machine-readable medium 1138 is non-transitory (in other words, not having any transitory signals) in that it does not embody a propagating signal. However, labeling the machine-readable medium 1138 "non-transitory" should not be construed to mean that the machine-readable medium 1138 is incapable of movement; the machine-readable medium 1138 should be considered as being transportable from one physical location to another. Additionally, since the machine-readable medium 1138 is tangible, the machine-readable medium 1138 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, techniques, instruction sequences, and computing machine program products that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method of electronic design automation (EDA) to generate a circuit design meeting functional safety (FS) design criteria, the method comprising:
   accessing, using one or more hardware processors, register transfer level (RTL) design data for the circuit design stored in memory, the circuit design comprising a plurality of circuit objects;
   accessing, using the one or more hardware processors, a set of FS data associated with an initial circuit design, the set of FS data describing one or more failure modes associated with the plurality of circuit objects, failure rate information for the plurality of circuit objects, and an associated FS design criterion for each failure mode;
   automatically analyzing the RTL design data using the set of FS data to perform one or more FS quality checks; and
   placing and routing the circuit design using the RTL design data and the set of FS data to perform FS-aware placement and routing, wherein the circuit design is provided for generating semiconductor circuits.

2. The method of claim 1, further comprising:
   automatically adjusting the RTL design data to implement a FS design adjustment when a FS quality check fails to meet the associated FS design criteria; and
   storing a circuit design file comprising FS-aware placement and routing data.

3. The method of claim 1, wherein the set of FS data comprises a single Unified Safety Format (USF) file.

4. The method of claim 3, wherein the set FS data of the USF file further comprises:
   safety intent data comprising one or more part or sub-part fields and one or more failure mode fields;
   failure mode design mapping data comprising failure mode distribution fields, instance target fields, and observation point fields; and
   safety design data comprising safety mechanism fields each identifying one or more safety mechanisms.

5. The method of claim 4, wherein the FS data of the USF file further comprises:
   safety mechanism design mapping data comprising diagnostic coverage fields, safety mechanism instant target fields, and detection port fields; and
   safety metric data comprising fault metric fields;
   wherein each field of the USF file is associated with a corresponding circuit object of the plurality of circuit objects.

6. The method of claim 5, wherein fields of the USF file associated with corresponding circuit objects of the plurality of circuit objects of the RTL design data are mapped during synthesis operations to generate a gate-level netlist.

7. The method of claim 6, further comprising:
   performing equivalence checking of the RTL design data and the gate-level netlist using the FS data following synthesis of the gate-level netlist.

8. The method of claim 1, wherein automatically analyzing the RTL design data using the set of FS data comprises determining that safety metric data of the FS data for the circuit design does not meet a safety threshold.

9. The method of claim 8, further comprising:
   identifying a safety mechanism associated with the safety metric data of the FS data for the circuit design that does not meet the safety threshold; and
   automatically updating the circuit design using the safety mechanism to improve the safety metric data.

10. The method of claim 9, wherein the safety mechanism comprises addition of modular redundancy circuitry for a circuit object of the plurality of circuit objects.

11. The method of claim 9, wherein the safety mechanism comprises addition of parity check circuitry for one or more registers of the plurality of circuit objects.

12. The method of claim 9, further comprising performing fault injection operations to validate diagnostic coverage of safety mechanisms described by the set of FS data.

13. The method of claim 9, further comprising generating one or more FS reports using the FS data, the FS reports comprising first failure mode, effects, and diagnostic analysis (FMEDA) data connecting the circuit design with the FS data and dependent failure analysis (DFA) reporting describing DFA countermeasures incorporated in the circuit design.

14. The method of claim 9, further comprising performing FS-aware signoff of the circuit design following placement and routing to identify and verify safety layout constraint implemented for safety mechanisms in the circuit design.

15. An electronic design automation (EDA) device for generating a circuit design meeting functional safety (FS) design criteria, the EDA device comprising:
   a memory configured to store:
   register transfer level (RTL) design data for the circuit design stored in memory, the circuit design comprising a plurality of circuit objects;
   FS data associated and the circuit design, the FS data comprising safety intent data for one or more of the plurality of circuit objects, failure rate information for the plurality of circuit objects, and associated failure mode design mapping, safety mechanism design mapping, safety design, and safety metric data for each of the one or more circuit objects described by the FS data; and a file describing one or more failure modes associated with a plurality of design objects and associated FS design criteria for each failure mode; and one or more processors coupled to the memory and configured to:

automatically analyze the RTL design data using the FS for one or more unmet FS design criteria to identify one or more safety mechanisms associated with one or more failure modes;

update the circuit design with safety mechanism circuit objects associated with the one or more safety mechanisms to generate an updated circuit design;

synthesize the updated circuit design using the FS data and the one or more FS design criteria; and place and route the updated circuit design using the FS data to perform FS-aware placement and routing, wherein the updated circuit design is provided for generating semiconductor circuits.

16. The EDA device of claim 15 wherein the one or more processors are further configured to:

identify a safety mechanism associated with the safety metric data of the FS data for the circuit design that does not meet a safety threshold, wherein automatically analyzing the RTL design data using the FS data comprises determining that safety metric data of the FS data for the circuit design does not meet a safety threshold; and automatically update the circuit design using the safety mechanism to improve the safety metric data, wherein the safety mechanism comprises addition of modular redundancy circuitry for a circuit object of the plurality of circuit objects.

17. The EDA device of claim 15, wherein the FS data comprises a single Unified Safety Format (USF) file, and wherein the FS data of the USF file further comprises:

safety intent data comprising one or more part or sub-part fields and one or more failure mode fields;

failure mode design mapping data comprising failure mode distribution fields, instance target fields, and observation point fields; and safety design data comprising safety mechanism fields each identifying one or more safety mechanisms.

18. A non-transitory computer readable storage medium comprising instructions that, when executed by one or more processors of a device, cause the device to perform operations for electronic design automation (EDA) to generate a circuit design meeting functional safety (FS) design criteria, the operations comprising:

accessing, using one or more hardware processors, register transfer level (RTL) design data for the circuit design stored in memory, the circuit design comprising a plurality of circuit objects;

accessing, using the one or more hardware processors, a Unified Safety Format (USF) file associated with the FS design criteria and the circuit design, the USF file describing one or more failure modes associated with the plurality of design objects, failure rate information for the plurality of circuit objects, and associated FS design criteria for each failure mode;

automatically analyzing the RTL design data using the USF file for one or more FS design criteria quality checks to identify one or more safety mechanisms associated with one or more failure modes;

updating the circuit design with safety mechanism objects associated with the one or more safety mechanisms to generate an updated circuit design;

synthesizing a gate-level netlist based on the updated circuit design, the USF file, and the one or more FS design criteria;

automatically performing FS-aware verification and checking of the updated circuit design;

generating one or more sets of FS reporting data using the gate-level netlist, the FS-aware verification and checking of the updated circuit design, and the FS data;

placing and routing the updated circuit design using the FS data to perform FS-aware placement and routing; and generating an output circuit design file with placing and routing data for the updated circuit design, wherein the output circuit design file is provided for generating semiconductor circuits.

19. The non-transitory computer readable medium of claim 18, wherein the set of FS data comprises a single Unified Safety Format (USF) file, and wherein the set FS data of the USF file further comprises:

safety intent data comprising one or more part or sub-part fields and one or more failure mode fields;

failure mode design mapping data comprising failure mode distribution fields, instance target fields, and observation point fields; and safety design data comprising safety mechanism fields each identifying one or more safety mechanisms;

safety mechanism design mapping data comprising diagnostic coverage fields, safety mechanism instant target fields, and detection port fields; and safety metric data comprising fault metric fields;

wherein each field of the USF file is associated with a corresponding circuit object of the plurality of circuit objects; and wherein fields of the USF file associated with corresponding circuit objects of the plurality of circuit objects of the RTL design data are mapped during synthesis operations to generate a gate-level netlist.

20. The non-transitory computer readable medium of claim 18, wherein the instructions further cause the device to perform operations comprising:

generating first failure mode, effects, and diagnostic analysis (FMEDA) report data using the RTL design data and the USF file prior to placing and routing the circuit design;

further synthesizing the gate-level netlist based on an equivalence check for the RTL design data; and generating second FMEDA report data from the gate-level netlist and the USF file as part of a FS verification.

\* \* \* \* \*